(12) United States Patent
Wey et al.

(10) Patent No.: US 12,472,510 B2
(45) Date of Patent: Nov. 18, 2025

(54) DEVICE, ASSEMBLY AND METHOD FOR SEPARATING TRAMP METALS FROM LIQUID RAW MATERIALS

(71) Applicant: TAI HAN EQUIPMENT ENTERPRISE CO., LTD., Taipei (TW)

(72) Inventors: Shyh-Yi Wey, Taipei (TW); Wen-Cheng Chang, Taipei (TW); Ken-Der Lin, Taipei (TW); Bao-Ding Li, Taipei (TW); Fu-Wen Hsiao, Taipei (TW); Hung-Yu Lin, Taipei (TW); Yu-Hao Wu, Taipei (TW); Huai-Hui Huang, Taipei (TW); Yi-Lun Lin, Taipei (TW)

(73) Assignee: TAI HAN EQUIPMENT ENTERPRISE CO., LTD., Taipei (TW)

( * ) Notice: Subject to any disclaimer, the term of this patent is extended or adjusted under 35 U.S.C. 154(b) by 505 days.

(21) Appl. No.: 17/965,051

(22) Filed: Oct. 13, 2022

(65) Prior Publication Data
US 2023/0147141 A1 May 11, 2023

(30) Foreign Application Priority Data
Nov. 10, 2021 (TW) .................. 110141872

(51) Int. Cl.
*B03C 1/28* (2006.01)
*B01D 29/52* (2006.01)
(Continued)

(52) U.S. Cl.
CPC .............. *B03C 1/286* (2013.01); *B03C 1/284* (2013.01); *B01D 29/52* (2013.01);
(Continued)

(58) Field of Classification Search
CPC ....... B03C 1/286; B03C 1/284; B03C 1/0332; B03C 1/288; B03C 2201/18;
(Continued)

(56) References Cited

U.S. PATENT DOCUMENTS

| 522,407 A | * | 7/1894 | Cummings | ............ B01D 35/12 |
| | | | | 210/333.1 |
| 3,938,971 A | * | 2/1976 | McClure | ................ B01D 46/76 |
| | | | | 55/300 |

(Continued)

FOREIGN PATENT DOCUMENTS

CN 207025570 U 2/2018

*Primary Examiner* — Liam Royce
(74) *Attorney, Agent, or Firm* — Birch, Stewart, Kolasch & Birch, LLP

(57) ABSTRACT

A device for separating tramp metals from liquid raw materials includes a body unit, a holding unit, a magnetic unit, a rinsing unit, and a driving unit. The body unit includes a tank for feeding-in and feeding-out liquid raw materials. The holding unit is coupled to the tank and includes and a plurality of non-magnetic holders received in the tank. The magnetic unit is mounted on the tank and includes an enclosure having a telescopic wall to be in a compressed or extended state. The rinsing unit is fixed on the interior of the tank to rinse the non-magnetic holders. The driving unit is coupled the tank and the magnetic unit for driving the magnet unit moving between a first and second positions. An assembly is assembled from the device. And a method is carried out by the device or the assembly.

14 Claims, 7 Drawing Sheets

(51) Int. Cl.
*B01D 29/64* (2006.01)
*B01D 35/12* (2006.01)

(52) U.S. Cl.
CPC .......... *B01D 29/6438* (2013.01); *B01D 35/12* (2013.01); *B03C 2201/18* (2013.01); *B03C 2201/28* (2013.01)

(58) Field of Classification Search
CPC ............... B03C 2201/28; B01D 29/52; B01D 29/6438; B01D 35/12
See application file for complete search history.

(56) References Cited

U.S. PATENT DOCUMENTS

| | | | | |
|---|---|---|---|---|
| 4,394,264 A * | 7/1983 | Schimion | ............. | C10M 175/04 |
| | | | | 209/229 |
| 5,389,243 A * | 2/1995 | Kaplan | ................ | B01D 29/665 |
| | | | | 210/120 |
| 6,077,333 A * | 6/2000 | Wolfs | ....................... | B03C 1/288 |
| | | | | 210/695 |
| 2019/0201913 A1* | 7/2019 | Wolfs | ....................... | B03C 1/005 |
| 2021/0322999 A1* | 10/2021 | Yazdanbakhsh | ........ | B03C 1/288 |

* cited by examiner

DEVICE, ASSEMBLY AND METHOD FOR SEPARATING TRAMP METALS FROM LIQUID RAW MATERIALS

FIELD

The disclosure is related to the technology for separating tramp metals from liquid raw materials, and particularly to a device, assembly and method for separating tramp metals from liquid raw materials.

BACKGROUND

As known in the prior art, U.S. Pat. No. 6,077,333 disclosed a device for removing magnetizable parts from a liquid. This device at least two disadvantages. One is as shown FIG. 2 of the patent. When the device is in the cleaning state, the magnets thereof are exposed to the outside such that the tramp metals contained in the air will be attracted by the magnets and brought into the interior of the tubes. The other is that when the equipment is in the cleaning state, the liquid raw material whose tramp metals have not been separated will still flow through the housing.

In addition, CN Utility Model Patent No. 207025570 also disclosed a fluid irons remover. One of the disadvantages of the remover is that when removing the irons attached on the tubes, the shell for receiving the magnets and tubes must be taken out from the pipeline manually. Moreover, when the shell is taken out from the pipeline, the liquid, whose irons have not been removed, will still flow through the pipeline.

SUMMARY

Therefore, one of the objectives of the disclosure is to provide a device for separating tramp metals from liquid raw materials which can improve the disadvantages of the prior arts mentioned above.

Another objective of the disclosure is to provide a method for separating tramp metals from liquid raw materials which is carried out by the device disclosed herein.

A further objective of the disclosure is to provide an assembly for separating tramp metals from liquid raw materials continuously and a method carried out by the assembly disclosed herein.

Thus, a device for separating tramp metals from liquid raw materials according the disclosure comprises a body unit, a holding unit, a magnetic unit, a rinsing unit and a driving unit. The body unit includes a tank having an open top side, a close bottom side, an inlet, and an outlet. The tank further defines a first space so that the liquid raw materials can be introduced from the inlet, passed through the first space and flowed out from the outlet. The holding unit includes a cover with a plurality of holes and a plurality of non-magnetic holders. The cover is secured on the open top side of the tank and has an upper surface and a lower surface. Each of the non-magnetic holders has a holding body and an opening disposed on one end of the holding body. The non-magnetic holders are disposed on the lower surface of the cover in a spaced manner and in a way that each of the openings thereof corresponds to each of the holes of the cover and the holding bodies thereof are received in the first space of the tank. The magnetic unit includes a base with an upper side and a lower side, a plurality of magnet members mounted on the lower side of the base in a spaced manner and an enclosure having a telescopic wall, a second space defined by the telescopic wall, an upper end connected to the lower side of the base and a lower end connected to the upper surface of the cover. The magnetic unit is coupled to the tank in such a way that it can move back and forth between a first and a second position, when the magnetic unit is located at the first position, the telescopic wall of the enclosure is in a compressed state and each of the magnetic members extends into the holding body of each of the non-magnetic holders through the opening thereof and when the magnetic unit is located at the second position, the telescopic wall of the enclosure is in an extended state so that the magnet members are received in the second space thereof. The rinsing unit includes an injector fixed on the inner surface of the tank for introducing rinsing liquid from outside to rinse the non-magnetic holders when the magnetic unit is located at the second position. The driving unit is coupled respectively to the tank and the magnetic unit for driving the magnet unit to move back and forth between the first and second positions relative to the tank.

The device disclosed here may have a further feature that the distance from the injector to the open top side of the tank is smaller than the distance from the injector to the close bottom side of the tank.

Another feature of the device disclosed here is that it further comprises a feed-in valve unit disposed at the inlet of the tank and a feed-out valve unit disposed at the outlet of the tank.

A further feature of the device disclosed here is that the tank further includes a discharge port disposed at the close bottom side thereof for discharging the liquid raw materials or the rinsing liquid received in the first space of the tank.

A further feature of the device disclosed here is that the device further comprises a first discharge valve unit disposed on a first path between the discharge port and outside and a second discharge valve unit disposed on a second path between the discharge port and outside.

A method for separating tramp metals from liquid raw materials according the disclosure, which is carried out by the device disclosed above, comprises the following steps:
  locating the magnetic unit in the first position;
  feeding-in the liquid raw materials from the inlet into the first space and feeding-out from the outlet for attracting the tramp metals of the liquid raw materials passing through the first space on the surface of each of the non-magnetic holders under the influence of the magnetic field produced from the magnetic unit;
  closing the inlet and the outlet after the previous step is performed for a first predetermined time;
  discharging the liquid raw materials remaining in the first space to outside;
  driving the magnetic unit by the driving unit from the first position to the second position;
  introducing a rinsing liquid from the outside to the injectors to remove the tramp metals attracted on the surface of each of the non-magnetic holders;
  unintroducing the rinsing liquid after the previous step is performed for a second predetermined time;
  discharging the rinsing liquid remaining in the first space to outside; and
  driving the magnetic unit by the driving unit from the second position to the first position for re-operating the method.

An assembly for separating tramp metals from liquid raw materials continuously according to according the disclosure comprises a first and second devices for separating tramp metals from liquid raw materials as described above. The assembly further comprises a main inlet, a main outlet, a first feed-in valve unit, a first feed-out valve unit, a second feed-in valve unit, a second feed-out valve unit and a control means. The main inlet respectively connected with the first inlet of the first device and the second inlet of the second device. The main outlet is respectively connected with the first outlet of the first device and the second outlet of the second device. The first feed-in valve unit is disposed on the first inlet of the first device. The first feed-out valve unit is disposed on the first outlet of the first device. The second feed-in valve unit is disposed on the second inlet of the second device. The second feed-out valve unit is disposed on the second outlet of the second device. The control means is respectively coupled with the first driving unit and all the valve units of the first device and the second driving unit and all the valve units of the second device so that the first and second device can be operated in turn thereby.

The assembly disclosed here may have a further feature that the first tank of the first device further includes a first discharge port disposed at the close bottom side thereof and the second tank of the second device further includes a second discharge port disposed at the close bottom side thereof.

Another feature of the assembly is that it further comprises a third discharge valve unit disposed on a third path between the first discharge port and outside, a fourth discharge valve unit disposed on a fourth path between the first discharge port and outside; a fifth discharge valve unit disposed on a fifth path between the second discharge port and outside and a sixth discharge valve unit disposed on a sixth path between the second discharge port and outside, and all of the discharge valve units are coupled with the control means A method for separating tramp metals from liquid raw materials continuously according to the disclosure, which is carried out by the assembly described above, comprises the following steps:

closing the second inlet and the second outlet;
locating the first magnetic unit of the first device in the first position;
feeding-in the liquid raw materials from the main inlet and the first inlet into the first space and feed-out it from the first outlet and the main outlet for attracting the tramp metals of the liquid raw materials passing through the first space on the surface of each of the first non-magnetic holders under the influence of the magnetic field produced from the first magnetic unit;
closing the first inlet and the first outlet after the previous step is performed for a first predetermined time;
discharging the liquid raw materials remained in the first space to outside;
driving the first magnetic unit by the first driving unit from the first position to the second position;
introducing a rinsing liquid from outside to the first injector to remove the tramp metals attracted on the surface of each of the first non-magnetic holders;
unintroducing the rinsing liquid after the previous step is performed for a second predetermined time;
discharging the rinsing liquid remained in the first space to outside;
locating the second magnetic unit of the second device in the first position;
feeding-in the liquid raw materials from the main inlet and the second inlet into the second space and feeding-out it from the second outlet and the main outlet for attracting the tramp metals of the liquid raw materials passing through the second space on the surface of each of the second non-magnetic holders under the influence of the magnetic field produced from the second magnetic unit;
closing the second inlet and the second outlet after the previous step is performed for a first predetermined time;
discharging the liquid raw materials remained in the second space to outside;
driving the second magnetic unit by the second driving unit from the first position to the second position;
introducing a rinsing liquid from outside to the second injector to remove the tramp metals attracted on the surface of each of the second non-magnetic holders;
unintroducing the rinsing liquid after the previous step is performed for the second predetermined time;
discharging the rinsing liquid remained in the second space to outside; and
driving the first magnetic unit by the first driving unit from the second position to the first position for re-operating the method.

BRIEF DESCRIPTION OF THE DRAWINGS

Other features and advantages of the disclosure will become readily apparent to those skilled in the art from the following detailed description of the embodiments in the light of the accompanying drawings, in which.

DETAILED DESCRIPTION

Figure 1:
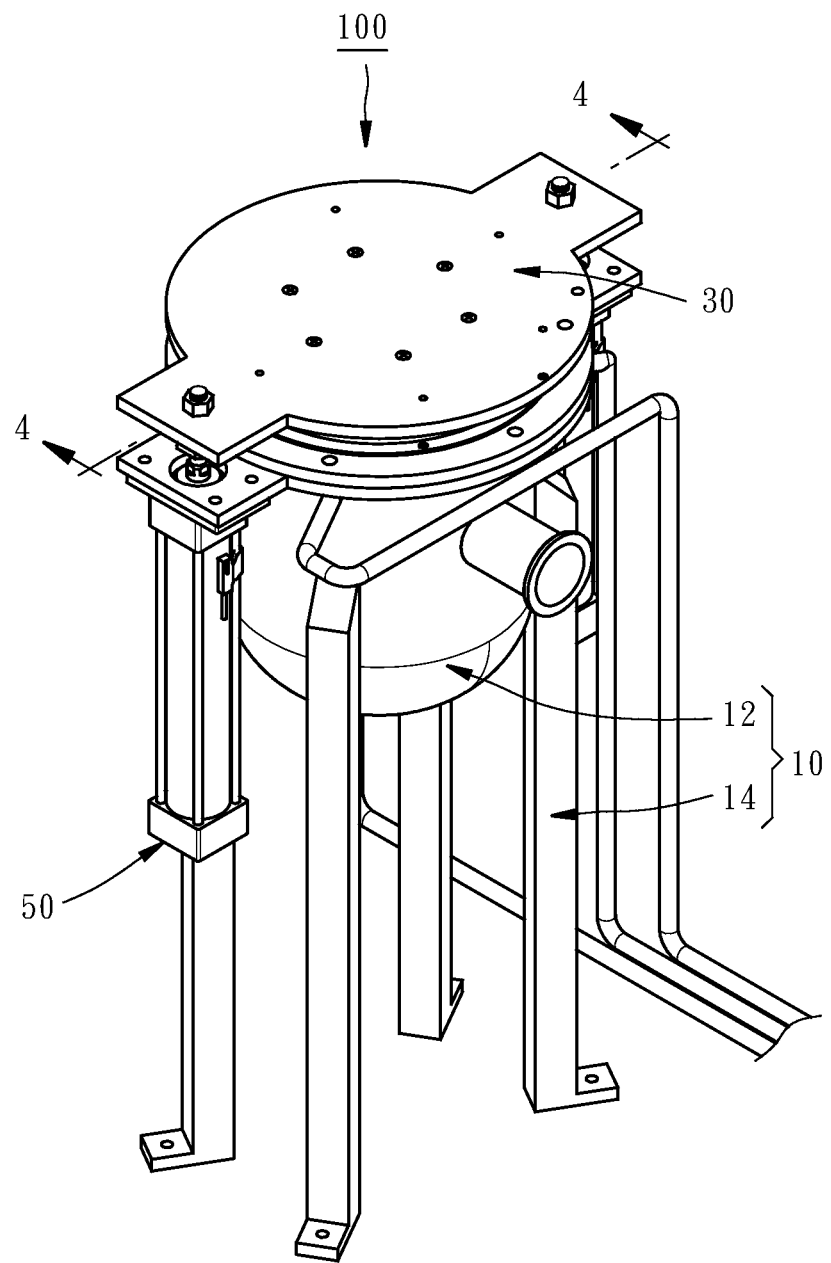
FIG. 1 is a perspective view of an embodiment of a device for separating tramp metals from liquid raw materials according to the disclosure, wherein the magnetic unit thereof in the first position.
Figure 2:
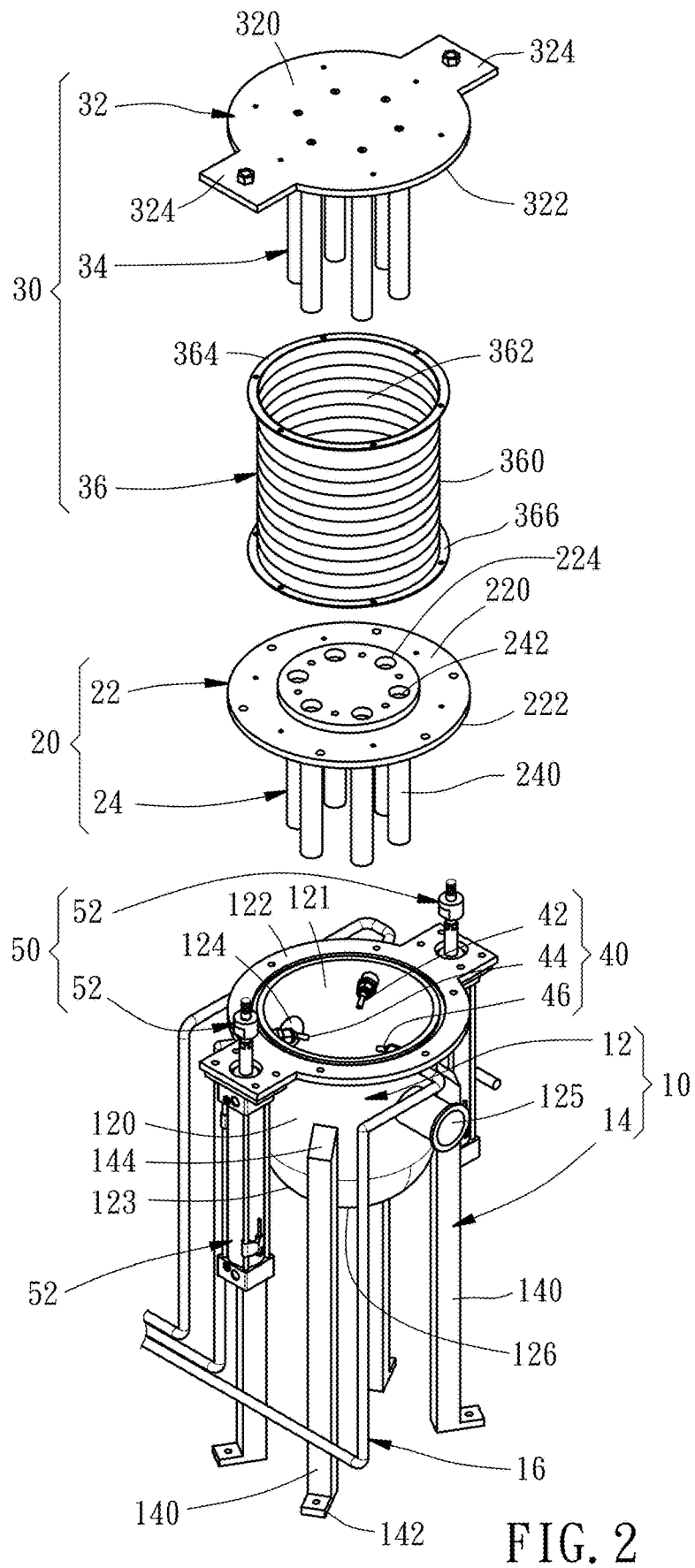
FIG. 2 is a partially exploded perspective view of the embodiment shown in FIG. 1.
Figure 3:
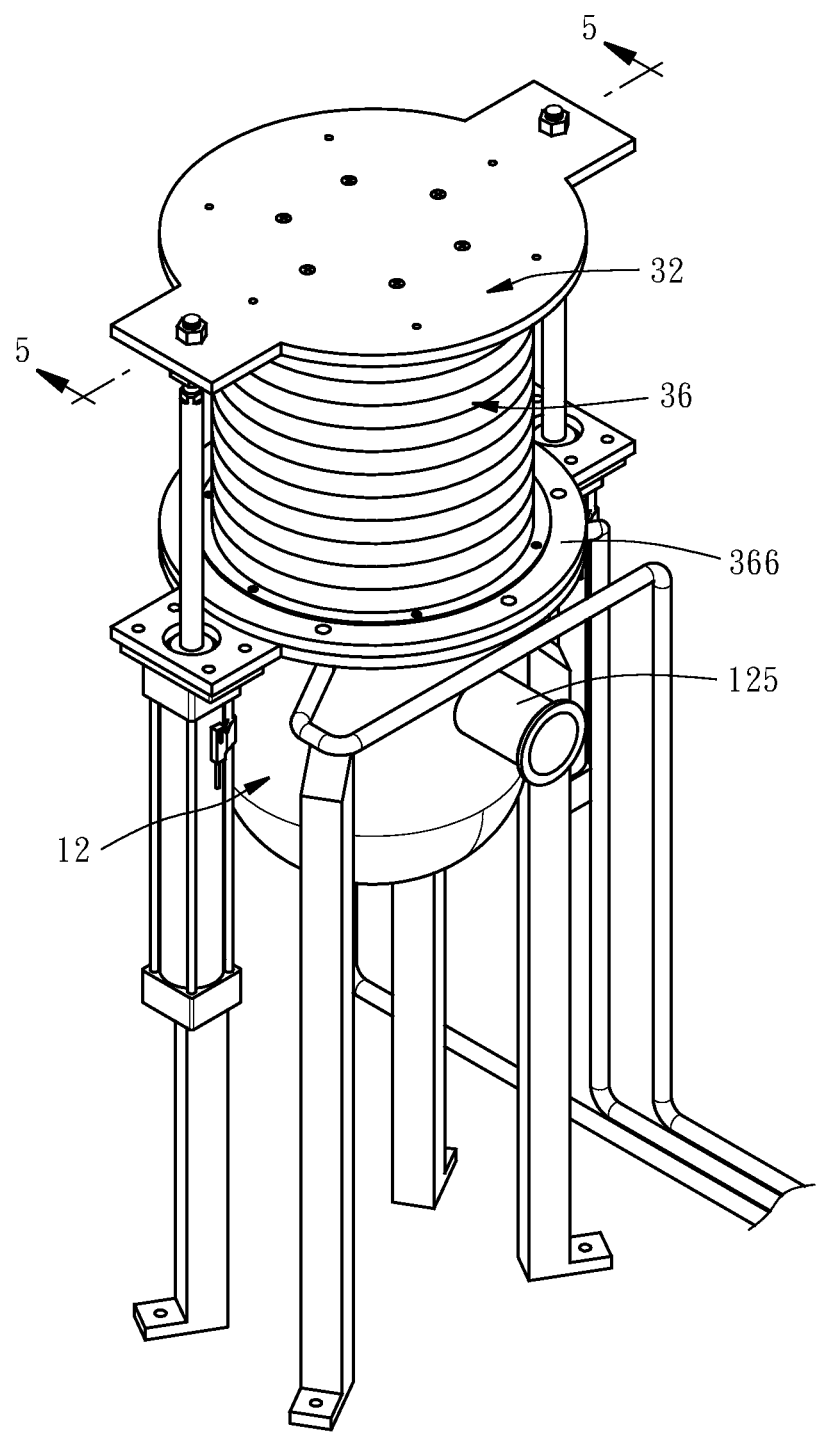
FIG. 3 is a perspective view of the embodiment shown in FIG. 1, wherein the magnetic unit thereof in the second position.

Referring firstly to FIG. 1 to FIG. 6, an embodiment of a device for separating tramp metals from liquid raw materials according to the disclosure is shown in the indication number 100. The device 100 comprises a body unit 10, a holding unit 20, a magnetic unit 30, a rinsing unit 40, a driving unit 50, a feed-in valve unit 60, a feed-out valve unit 62, a first discharge valve unit 64 and a second discharge valve unit 66.

The body unit 10 includes a tank 12 and a supporting stand 14. The tank 12 has a body wall 120 defining a first space 121, an open top side 122, a close bottom side 123, an inlet 124, an outlet 125, and a discharge port 126 disposed at the close bottom side 123. The supporting stand 14 has four legs 140 evenly fixed to the body wall 122. Each of the legs 140 has a bottom end 142 secured on the ground and a top end 144 secured on the outer surface of the body wall 122.

The holding unit 20 includes a cover 22 and a plurality of non-magnetic holders 24. The cover 22 is secured on the open top side 122 of the tank 12 and has an upper surface 220, a lower surface 222 and a plurality of holes 224. Each of the non-magnetic holders 24 has a cylindrical holding body 240 with an opening 242 on one end of the holding body 240. The non-magnetic holders 24 are disposed on the lower surface 222 of the cover 22 in a spaced manner and in a way that each of the openings 242 thereof corresponds to each of the holes 224 of the cover 22 and the holding bodies 240 thereof are received in the first space 121 of the tank 12.

The magnetic unit 30 includes a base 32 with an upper side 320 and a lower side 322, a plurality of magnet members 34 mounted on the lower side 322 of the base 32 in a spaced manner and an enclosure 36 having a telescopic wall 360, a second space 362 defined by the telescopic wall 360, an upper end 364 connected to the lower side 322 of the base 32 and a lower end 366 connected to the upper surface 220 of the cover 22. In this embodiment, the enclosure 36 is a plastic cylindrical tube with a multi-fold wall. The magnetic unit 30 is coupled to the tank 12 in such a way that can move back and forth between a first and a second position, when the magnetic unit 30 is located at the first position, the telescopic wall 360 of the enclosure 36 is in a compressed state and each of the magnetic members 34 inserts into the holding body 240 of each of the non-magnetic holders 24 via the opening 224 thereof and when the magnetic unit 30 is located at the second position, the telescopic wall 360 of the enclosure 36 is in an extended state so that the magnet members 34 are received in the second space 362 for isolating from the outside.

Figure 4:
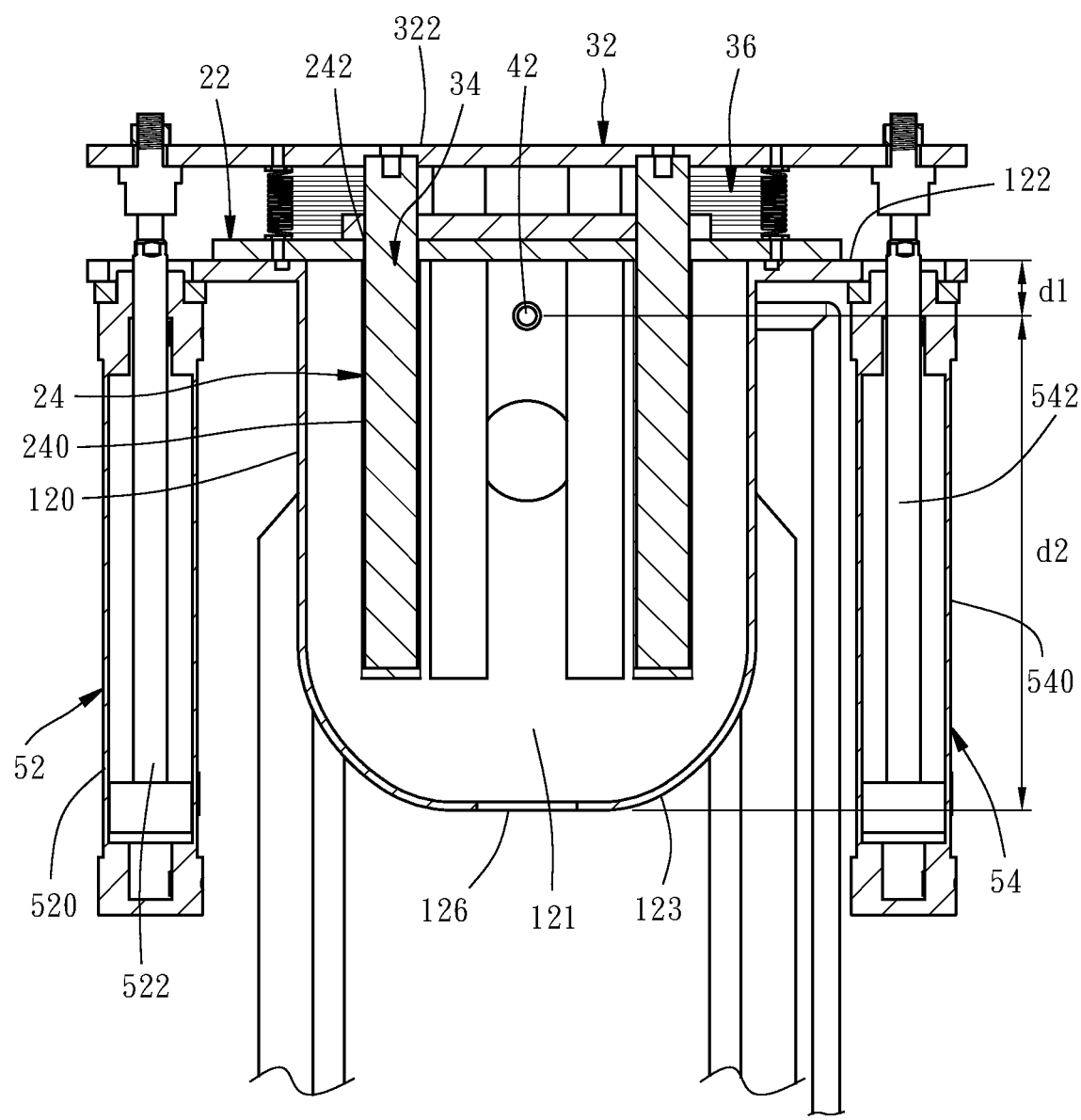
FIG. 4 is a cross-sectional view taken along the direction 4-4 of FIG. 1.
Figure 5:
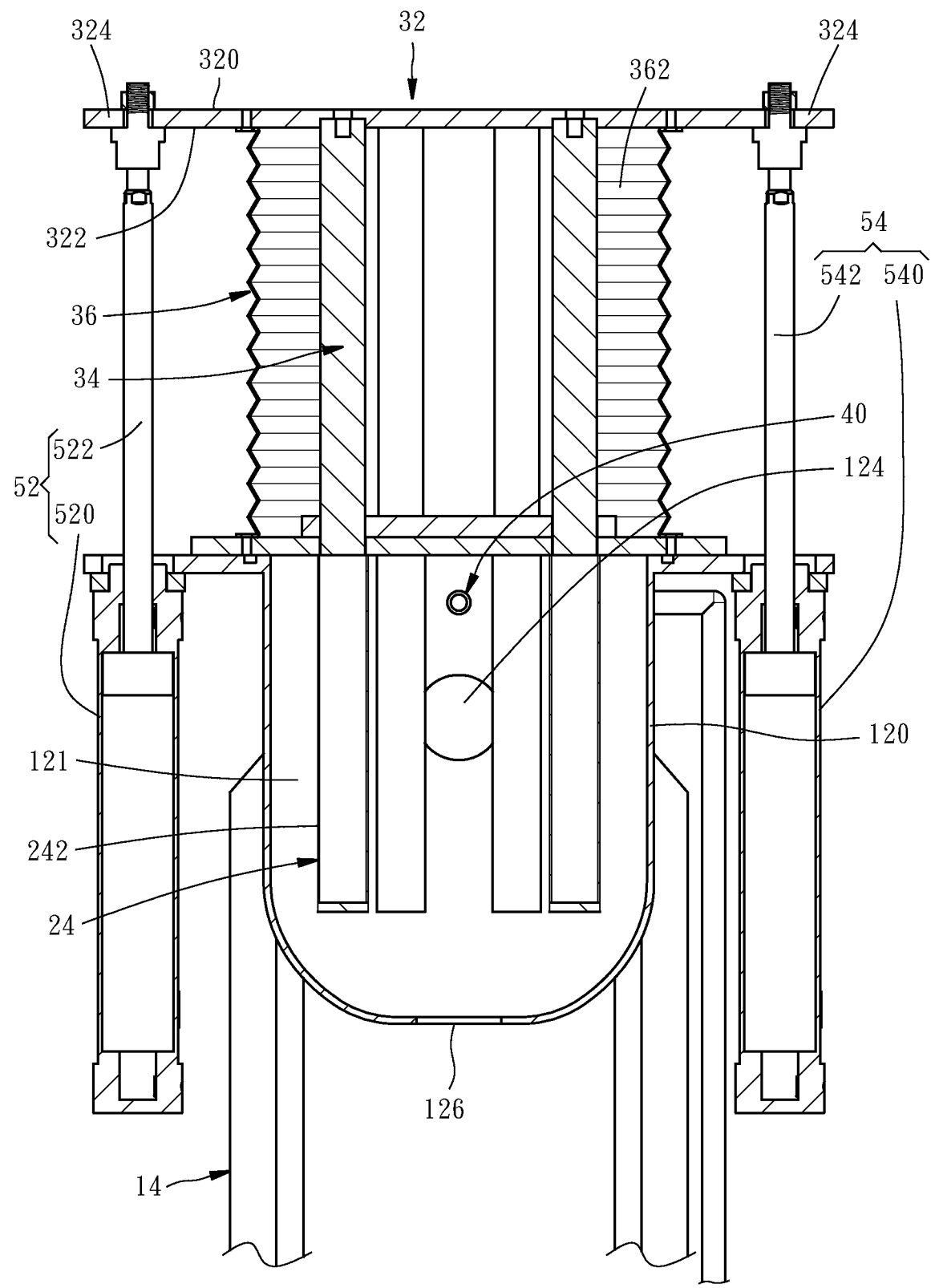
FIG. 5 is a cross-sectional view taken along the direction 5-5 of FIG. 3.

The rinsing unit 40, in this embodiment, includes three injectors 42, 44, and 46 fixed respectively on the inner surface 121 of the tank 12 at a predetermined interval from each other and on the same plane. All of the injectors 42, 44, and 46 are connected with outside piping 16 for introducing rinsing liquid from outside to rinse the non-magnetic holders 24 when the magnetic unit 30 is located at the second position. Furthermore, as shown in FIG. 4, the distance d1 from each of three injectors 42, 44, and 46 to the open top side 122 of the tank 12 is smaller than the distance d2 from each of the injectors 42, 44, and 46 to the close bottom side 126 of the tank 12 so that the tramp metals adhering on the outer surface of each of the non-magnetic holders 24 can be removed more cleanly.

The driving unit 50, in this embodiment, includes a pair of pneumatic cylinders 52, 54 coupled respectively to the tank 12 and the magnetic unit 30 for driving the magnet unit 30 to move back and forth between the first and second positions relative to the tank 12. In more detail, each of the pneumatic cylinders 52, 54 has a cylinder body 520, 540 connected with the tank 12 and a piston 522, 542 connected with an ear 324 of the base 32 of the magnetic unit 30.

Figure 6:
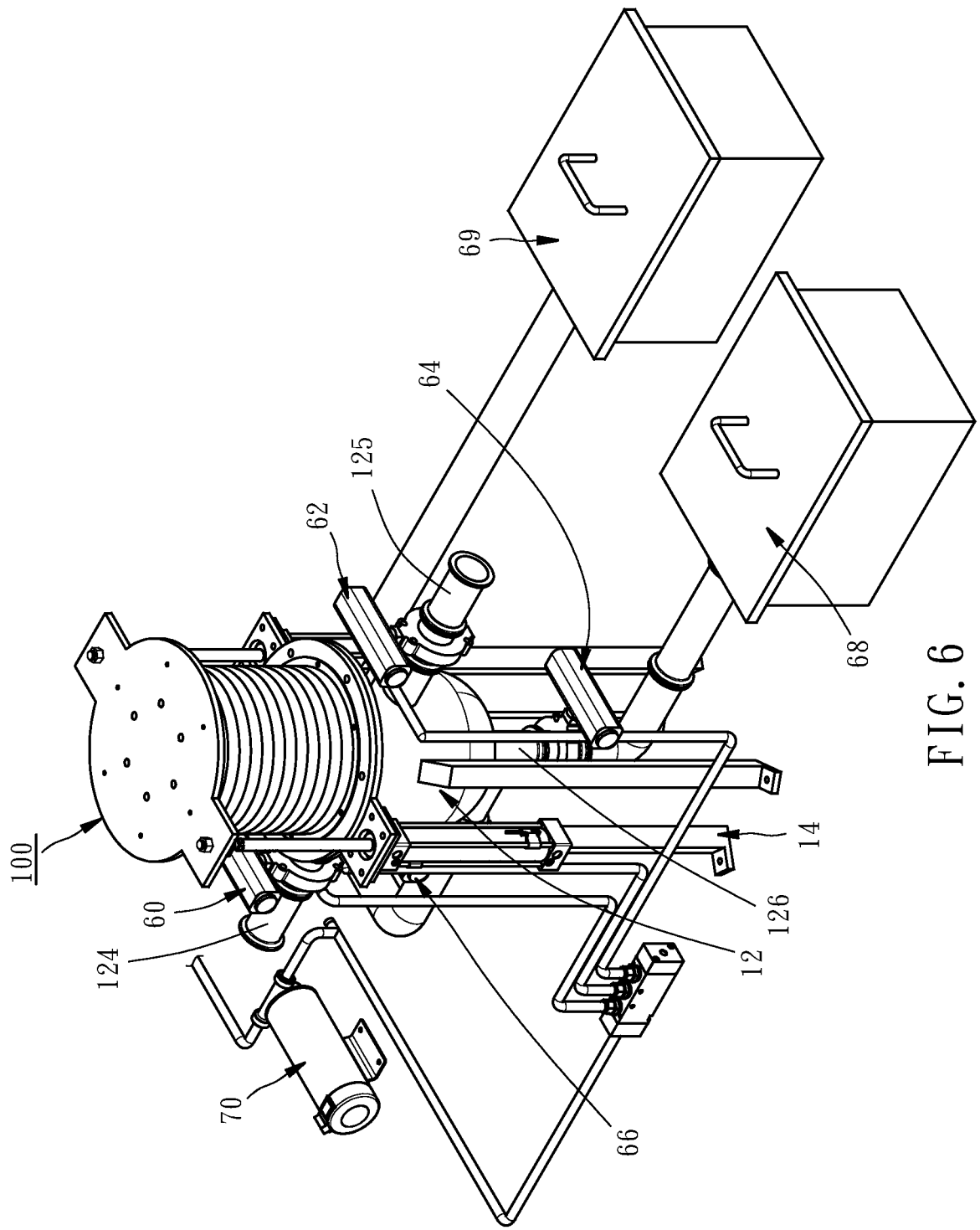
FIG. 6 is a perspective view of the embodiment shown in FIG. 1 cooperating with some external components for illustrating a method for separating tramp metals from liquid raw materials carried out thereby according to the disclosure.

The feed-in valve unit 60, as shown in FIG. 6, is coupled to the inlet 124 of the tank 12 and the feed-out valve unit 62 is coupled to the outlet 125 of the tank 12 for controlling the opening and closing thereof. The first discharge valve unit 64 is disposed on a first path between the discharge port 126 and a first storage tank 68, the second discharge valve unit 66 is disposed on a second path between the discharge port 126 and a second storage tank 69 so that when the first path is opened by the first discharge valve unit 64, the liquid raw material received in the first space 121 of the tank 12 can be discharged therefrom to the first storage tank 68 to be used as the rinsing liquid and when the second path is opened by the second discharge valve unit 66, the rinsing liquid received in the first space 12 of the tank 12 can be discharged therefrom to the second storage tank 69.

An embodiment of a method for separating tramp metals from liquid raw materials according to the disclosure is described below. The method is carded out by the device 100 and comprises the following steps:

locating the magnetic unit 30 in the first position;
opening the inlet 124 by the feed-in valve unit 60 and the outlet 125 by the feed-out valve unit 62,
feeding-in the liquid raw materials from the inlet 124 into the first space 121 and feeding-out from the outlet 125 so that when the liquid raw materials pass through the first space 121, the tramp metals thereof are attracted on the surface of each of the non-magnetic holders 240 under the influence of the magnetic field produced from the magnetic unit 30;
closing the inlet 124 by the feed-in valve unit 60 and the outlet 125 by the feed-out valve unit 62 after the previous step is performed for a first predetermined time;
opening the first path by the first discharge valve unit 64;
discharging the liquid raw materials remaining in the first space 121 from the first path to the first storage tank 68 and then closing the first path;
driving the magnetic unit 30 by the driving unit 50 from the first position to the second position;
introducing the liquid raw materials stored in the first storage tank 68 as a rinsing liquid via the outside piping 16 to the injectors 42, 44 and 46 to remove the tramp metals attracted on the surface of each of the non-magnetic holders 24;
unintroducing the rinsing liquid after the previous step is performed for a second predetermined time;
opening the second path by the second discharge valve unit 64;
discharging the rinsing liquid remaining in the first space 121 from the second path to the second storage tank 69 and then closing the second path; and
driving the magnetic unit 30 by the driving unit 50 from the second position to the first position for re-operating the method.

Figure 7:
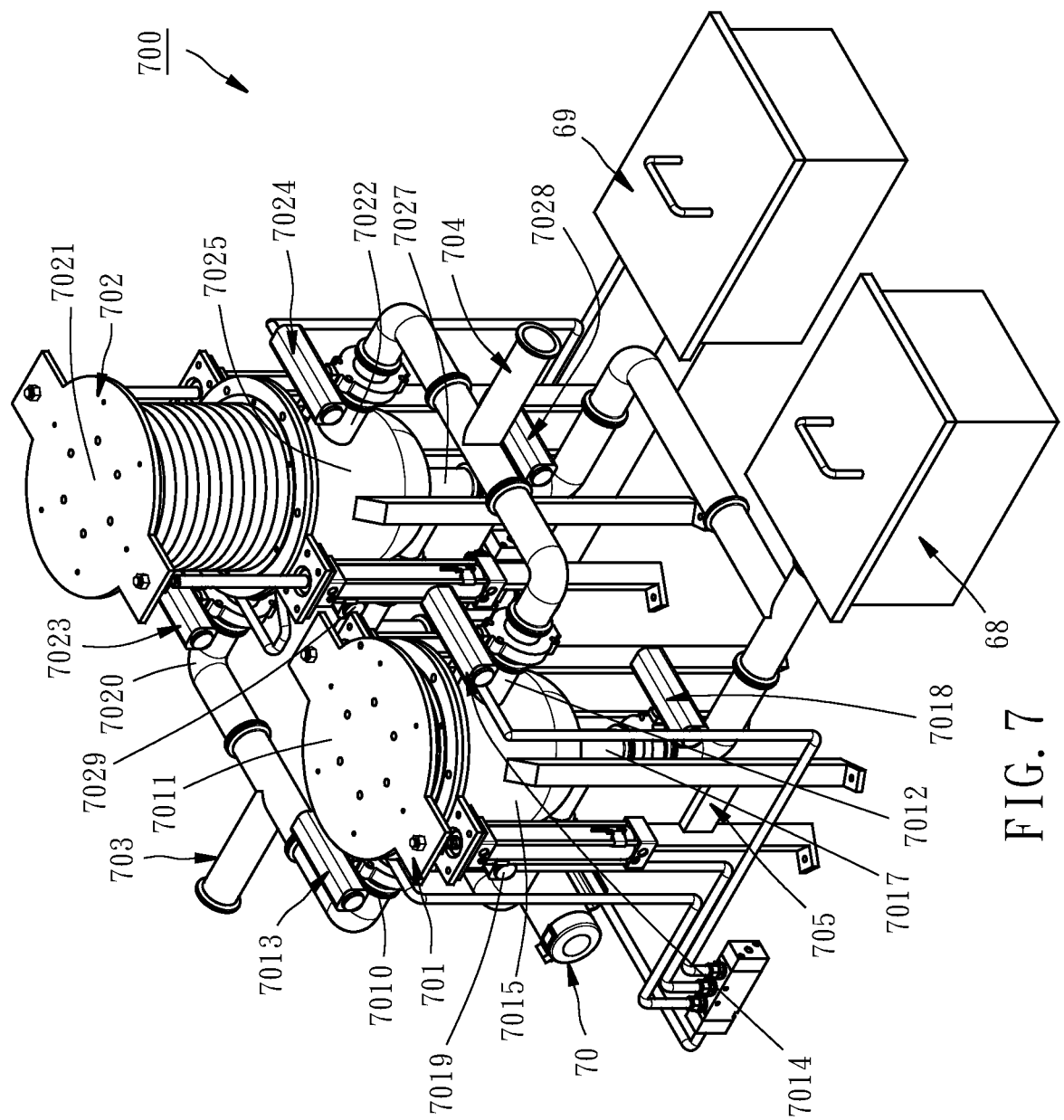
FIG. 7 is a perspective view of an embodiment of an assembly for separating tramp metals from liquid raw materials according to the disclosure, wherein the first magnetic unit thereof in the first position and the second magnetic unit thereof in the second position.

Next, please referring to FIG. 7, an embodiment of an assembly for separating tramp metals from liquid raw materials continuously according to the disclosure is shown in the indication number 700. The assembly 700 comprises a first and second devices 701, 702 for separating tramp metals from liquid raw materials. In this embodiment, the first device 701 and the second device 702 are structurally the same as the device 100.

The assembly 700 further comprises a main inlet 703, a main outlet 704, a control means 705. The main inlet 703 is respectively connected with the first inlet 7010 of the first device 701 and the second inlet 7020 of the second device 702. The main outlet 704 is respectively connected with the first outlet 7012 of the first device 701 and the second outlet 7022 of the second device 702. The control means 705 is respectively coupled with all the valve units of the first device 701 and all the valve units of the second device 702.

An embodiment of a method for separating tramp metals from liquid raw materials continuously according to the disclosure carried out by the assembly 700 is described below. The method comprises the following steps:

closing the second inlet 7020 by the second feed-in valve unit 7023 and the second outlet 7022 by the second feed-out valve unit 7024;
locating the first magnetic unit 7011 of the first device 701 in the first position;

closing the third path between the first discharge port 7017 and the first storage tank 68 by the third discharge valve unit 7018 and the fourth path between the first discharge port 7017 and the second storage tank 69 by the fourth discharge valve unit 7019;

opening the first inlet 7010 by the first feed-in valve unit 7013 and the first outlet 7012 by the first feed-out valve unit 7014;

feeding-in the liquid raw materials from the main inlet 703 and the first inlet 7010 into the first tank 7015 and feeding-out it from the first outlet 7012 and the main outlet 704 so that when the liquid raw materials pass through the first tank 7015, the tramp metals thereof are attracted on the surface of each of the first non-magnetic holders;

closing the first inlet 7010 by the first feed-in valve unit 7013 and the first outlet 7012 by the first feed-out valve unit 7023 after the previous step is performed for a first predetermined time;

opening the third path by the third discharge valve unit 7018;

discharging the liquid raw materials remained in the first tank 7015 from the third path to the first storage tank 68 and then closing the third path;

driving the first magnetic unit 7011 by the first driving unit of the first device 701 from the first position to the second position;

introducing the liquid raw materials stored in the first storage tank 68 as a rinsing liquid via the outside piping 16 to the first injectors by a pump unit 70 to remove the tramp metals attracted on the surface of each of the first non-magnetic holders;

unintroducing the rinsing liquid after the previous step is performed for a second predetermined time;

opening the fourth path by the fourth discharge valve unit 7019;

discharging the rinsing liquid remained in the first tank 7015 from the fourth path to the second storage tank 69;

closing the first inlet 7010 by the first feed-in valve unit 7013 and the first outlet 7012 by the first feed-out valve unit 7014;

locating the second magnetic unit 7021 of the second device 702 in the first position;

closing a fifth path between the second discharge port 7027 and the first storage tank 68 by the fifth discharge valve unit 7028 and the sixth path between the second discharge port 7027 and the second storage tank 69 by the sixth discharge valve unit 7029;

opening the second inlet 7020 by the second feed-in valve unit 7023 and the second outlet 7022 by the second feed-out valve unit 7024;

feeding-in the liquid raw materials from the main inlet 703 and the second inlet 7020 into the second tank 7025 and feeding-out it from the second outlet 7022 and the main outlet 704 so that when the liquid raw materials pass through the second tank, the tramp metals thereof are attracted on the surface of each of the second non-magnetic holders of the second device 702;

closing the second inlet 7020 by the second feed-in valve unit 7023 and the second outlet 7022 by the second feed-out valve unit 7024 after the previous step is performed for the first predetermined time;

opening the fifth path by the fifth discharge valve unit 7028;

discharging the liquid raw materials remained in the second tank 7025 from the fifth path to the first storage tank 68;

closing the fifth path by the fifth discharge valve unit 7028;

driving the second magnetic unit 7021 by the second driving unit of the second device 702 from the first position to the second position;

introducing the liquid raw materials stored in the first storage tank 68 as a rinsing liquid via the outside piping 16 to the second injectors by the pump unit 70 to remove the tramp metals attracted on the surface of each of the first non-magnetic holders;

unintroducing the rinsing liquid after the previous step is performed for the second predetermined time; and opening the sixth path by the sixth discharge valve unit 7029;

discharging the rinsing liquid remained in the second tank 7025 from the sixth path to the second storage tank 69 and then closing the sixth path; and driving the first magnetic unit 7011 by the first driving unit from the second position to the first position for re-operating out the method.

What is claimed is:

1. A device for separating tramp metals from liquid raw materials, comprising:

a body unit including a tank having an open top side, a closed bottom side, an inlet, and an outlet, the tank further defining a first space through which the liquid raw materials are introduced from the inlet, passed through the first space and flowed out from the outlet;

a holding unit including a cover with a plurality of holes and a plurality of non-magnetic holders, the cover secured on the open top side of the tank and having an upper surface and a lower surface, each of the non-magnetic holders having a holding body and an opening disposed on one end of the holding body, the non-magnetic holders disposed on the lower surface of the cover in a spaced manner and in a way that each of the openings thereof corresponds to each of the holes of the cover and the holding bodies thereof are received in the first space of the tank;

a magnetic unit including a base with an upper side and a lower side, a plurality of magnet members mounted on the lower side of the base in a spaced manner and an enclosure having a telescopic wall, a second space defined by the telescopic wall, an upper end connected to the lower side of the base and a lower end connected to the upper surface of the cover, the magnetic unit coupled to the tank and adapted to move back and forth between a first position and a second position, when the magnetic unit is located at the first position, the telescopic wall of the enclosure is in a compressed state and each of the magnetic members inserts into the holding body of each of the non-magnetic holders through the opening thereof and when the magnetic unit is located at the second position, the telescopic wall of the enclosure is in an extended state so that the magnet members are received in the second space thereof;

a rinsing unit including an injector fixed on the inner surface of the tank for introducing a rinsing liquid from outside to the injector to rinse the non-magnetic holders for removing the tramp metals attracted on the surface of each of the non-magnetic holders when the magnetic unit is located at the second position; and a driving unit coupled respectively to the tank and the magnetic unit for driving the magnet unit to move back and forth between the first and second positions relative to the tank.

2. The device for separating tramp metals from liquid raw materials of claim 1,
wherein the rinsing unit comprises a plurality of injectors fixed on the inner surface of the tank at a predetermined interval from each other and on the same plane.

3. The device for separating tramp metals from liquid raw materials of claim 1,
wherein the distance from the injector to the open top side of the tank is smaller than the distance from the injector to the closed bottom side of the tank.

4. The device for separating tramp metals from liquid raw materials of claim 1,
wherein the driving unit comprises a pneumatic cylinder with a cylinder body connected with the tank and a piston connected with the base of the magnetic unit.

5. The device for separating tramp metals from liquid raw materials of claim 1,
wherein the enclosure comprises a plastic cylindrical tube with a multi-fold wall.

6. The device for separating tramp metals from liquid raw materials of claim 1,
further comprising a feed-in valve unit disposed at the inlet of the tank and a feed-out valve unit disposed at the outlet of the tank.

7. The device for separating tramp metals from liquid raw materials of claim 1, wherein the tank further includes a discharge port disposed at the closed bottom side thereof for discharging the liquid raw materials or the rinsing liquid received in the first space of the tank.

8. The device for separating tramp metals from liquid raw materials of claim 7,
further comprising a first discharge valve unit disposed on a first path between the discharge port and a first storage tank and a second discharge valve unit disposed on a second path between the discharge port and a second storage tank.

9. A method for separating tramp metals from liquid raw materials which is carried out by the device of claim 1, the method comprising the following steps:
locating the magnetic unit in the first position;
opening the inlet by a feed-in valve unit and the outlet by a feed-out valve unit;
feeding-in the liquid raw materials from the inlet into the first space and feeding-out from the outlet so that when the liquid raw materials pass through the first space, the tramp metals thereof are attracted on the surface of each of the non-magnetic holders under the influence of the magnetic field produced from the magnetic unit;
closing the inlet and the outlet after the previous step is performed for a first predetermined time;
discharging the liquid raw materials remaining in the first space to outside;
driving the magnetic unit by the driving unit from the first position to the second position;
introducing a rinsing liquid from outside to the injector to rinse the non-magnetic holders for removing the tramp metals attracted on the surface of each of the non-magnetic holders;
unintroducing the rinsing liquid after the previous step is performed for a second predetermined time;
discharging the rinsing liquid remaining in the first space to outside; and
driving the magnetic unit by the driving unit from the second position to the first position to re-operating the method.

10. A method for separating tramp metals from liquid raw materials,
which is carried out by the device of claim 8, the method comprising the following steps:
locating the magnetic unit in the first position;
opening the inlet by a feed-in valve unit and the outlet by a feed-out valve unit;
feeding-in the liquid raw materials from the inlet into the first space and feeding-out from the outlet so that when the liquid raw materials pass through the first space, the tramp metals thereof are attracted on the surface of each of the non-magnetic holders under the influence of the magnetic field produced from the magnetic unit;
closing the inlet and the outlet after the previous step is performed for a first predetermined time;
opening the first path by the first discharge valve unit;
discharging the liquid raw materials remained in the first space from the first path to the first storage tank;
closing the first path by the first discharge valve unit;
driving the magnetic unit by the driving unit from the first position to the second position;
introducing the liquid raw materials stored in the first storage tank as a rinsing liquid to the injector to rinse the first non-magnetic holders for removing the tramp metals attracted on the surface thereof;
unintroducing the rinsing liquid after the previous step is performed for a second predetermined time;
opening the second path by the second discharge valve unit;
discharging the rinsing liquid remaining in the first space from the second path to the second storage tank;
closing the second path by the second discharge valve unit; and
driving the magnetic unit by the driving unit from the second position to the first position to re-operating the method.

11. An assembly for separating tramp metals from liquid raw materials,
comprising:
a first device for separating tramp metals from liquid raw materials of claim 1;
a second device for separating tramp metals from liquid raw materials of claim 1;
a main inlet respectively connected with the first inlet of the first device and the second inlet of the second device;
a main outlet respectively connected with the first outlet of the first device and the second outlet of the second device;
a first feed-in valve unit disposed on the first inlet of the first device;
a first feed-out valve unit disposed on the first outlet of the first device;
a second feed-in valve unit disposed on the second inlet of the second device;
a second feed-out valve unit disposed on the second outlet of the second device; and
a control means respectively coupled with the first driving unit and all the valve units of the first device and the second driving unit and all the valve units of the second device so that the first and second device are operated in turn.

12. The assembly for separating tramp metals from liquid raw materials of claim 11, wherein the first tank of the first device further includes a first discharge port disposed at the closed bottom side thereof and the second tank of the second device further includes a second discharge port disposed at the closed bottom side thereof.

13. The assembly for separating tramp metals from liquid raw materials of claim 12, further comprising a third discharge valve unit disposed on a third path between the first discharge port and a first storage tank, a fourth discharge valve unit disposed on a fourth path between the first discharge port and a second storage tank; a fifth discharge valve unit disposed on a fifth path between the second discharge port and the first storage tank and a sixth discharge valve unit disposed on a sixth path between the second discharge port and the second storage tank, and all of the discharge valve units are coupled with the control means.

14. A method for separating tramp metals from liquid raw materials which is carried out by the assembly of claim 13, the method comprising the following steps:

closing the second inlet by the second feed-in valve unit and the second outlet by the second feed-out valve unit;

locating the first magnetic unit of the first device in the first position;

closing the third and fourth path by the third and fourth discharge valve unit;

opening the first inlet by the first feed-in valve unit and the first outlet by the first feed-out valve unit;

feeding-in the liquid raw materials from the main inlet and the first inlet into the first space and feeding-out it from the first outlet and the main outlet so that when the liquid raw materials pass through the first space, the tramp metals thereof are attracted on the surface of each of the first non-magnetic holders;

closing the first feed-in valve unit and the first feed-out valve unit after the previous step is performed for a first predetermined time;

opening the third path by the third discharge valve unit;

discharging the liquid raw materials remained in the first space from the third path to the first storage tank;

closing the third path by the third discharge valve unit;

driving the first magnetic unit by the first driving unit from the first position to the second position;

introducing the liquid raw materials stored in the first storage tank as a rinsing liquid to the first injector to rinse the first non-magnetic holders for removing the tramp metals attracted on the surface thereof;

unintroducing the rinsing liquid after the previous step is performed for a second predetermined time;

opening the fourth path by the fourth discharge valve unit;

discharging the rinsing liquid remained in the first space from the fourth path to the second storage tank;

closing the first inlet by the first feed-in valve unit and the first outlet by the first feed-out valve unit;

locating the second magnetic unit of the second device in the first position;

closing the fifth and sixth paths by the fifth and sixth discharge valve unit;

opening the second inlet by the second feed-in valve unit and the second outlet by the second feed-out valve unit;

feeding-in the liquid raw materials from the main inlet and the second inlet into the second space and feeding-out it from the second outlet and the main outlet so that when the liquid raw materials pass through the second space, the tramp metals thereof are attracted on the surface of each of the second non-magnetic holders;

closing the second inlet by the second feed-in valve unit and the second outlet by the second feed-out valve unit after the previous step is performed for the first predetermined time;

opening the fifth path discharge port by the fifth discharge valve unit;

discharging the liquid raw materials remained in the second space from the fifth path to the first storage tank;

closing the fifth path by the fifth discharge valve unit;

driving the second magnetic unit by the second driving unit from the first position to the second position;

introducing the liquid raw materials stored in the first storage tank as a rinsing liquid to the second injector to rinse the second non-magnetic holders for removing the tramp metals attracted on the surface thereof;

unintroducing the rinsing liquid after the previous step is performed for the second predetermined time; and opening the sixth path by the sixth discharge valve unit;

discharging the rinsing liquid remained in the second space from the sixth path to the second storage tank; and driving the first magnetic unit by the first driving unit from the second position to the first position for re-operating out the method.

* * * * *